United States Patent
Yoshimura et al.

(10) Patent No.: US 11,093,296 B2
(45) Date of Patent: Aug. 17, 2021

(54) SYSTEM, VIRTUALIZATION CONTROL APPARATUS, METHOD FOR CONTROLLING A VIRTUALIZATION CONTROL APPARATUS, AND PROGRAM

(71) Applicant: NEC Corporation, Tokyo (JP)

(72) Inventors: Yuki Yoshimura, Tokyo (JP); Hirokazu Shinozawa, Tokyo (JP); Yoshiki Kikuchi, Tokyo (JP); Naoya Yabushita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 217 days.

(21) Appl. No.: 15/545,154

(22) PCT Filed: Jan. 26, 2016

(86) PCT No.: PCT/JP2016/052174
§ 371 (c)(1),
(2) Date: Jul. 20, 2017

(87) PCT Pub. No.: WO2016/121754
PCT Pub. Date: Aug. 4, 2016

(65) Prior Publication Data
US 2018/0024866 A1    Jan. 25, 2018

(30) Foreign Application Priority Data
Jan. 28, 2015    (JP) .............................. JP2015-014615

(51) Int. Cl.
*G06F 15/16*    (2006.01)
*G06F 9/50*    (2006.01)
(Continued)

(52) U.S. Cl.
CPC ........ *G06F 9/5077* (2013.01); *G06F 9/45558* (2013.01); *G06F 9/46* (2013.01);
(Continued)

(58) Field of Classification Search
CPC ................... G06F 11/1484; G06F 9/50; G06F 2009/45562; G06F 9/46; G06F 9/45558;
(Continued)

(56) References Cited

U.S. PATENT DOCUMENTS

| | | |
|---|---|---|
| 8,276,140 B1 | 9/2012 | Beda, III et al. |
| 2003/0149757 A1* | 8/2003 | Ueno ................. H04L 12/2803 709/223 |

(Continued)

FOREIGN PATENT DOCUMENTS

| | | |
|---|---|---|
| CN | 104166581 A | 11/2014 |
| JP | 2011203810 A | 10/2011 |

(Continued)

OTHER PUBLICATIONS

Coupling VNF Orchestration and SDN Virtual Network Reconfiguration Nemanja Đerić;Amir Varasteh;Arsany Basta;Andreas Blenk;Rastin Pries;Michael Jarschel;Wolfgang Kellerer 2019 International Conference on Networked Systems (NetSys) (Year: 2019).*

(Continued)

Primary Examiner — Oscar A Louie
Assistant Examiner — Oluwatosin M Gidado
(74) Attorney, Agent, or Firm — Sughrue Mion, PLLC

(57) ABSTRACT

A system includes a server that comprises a virtualization layer in which a hardware resource is virtualized, and a virtualization control apparatus. The virtualization control apparatus requests first information regarding the hardware resource to the server, registers second information corresponding to the first information acquired from the server, and uses the second information to control a network function (Virtual Network Function: VNF) implemented and virtualized by software operating on a virtual machine implemented on the virtualization layer.

7 Claims, 14 Drawing Sheets

(51) Int. Cl.
  *G06F 9/46* (2006.01)
  *H04L 12/46* (2006.01)
  *G06F 9/455* (2018.01)
  *H04L 12/24* (2006.01)
(52) U.S. Cl.
  CPC .......... *G06F 9/50* (2013.01); *H04L 12/46*
       (2013.01); *H04L 41/0806* (2013.01); *H04L*
       *41/50* (2013.01); *G06F 2009/45562* (2013.01);
                                *H04L 41/0816* (2013.01)
(58) Field of Classification Search
  CPC .......... G06F 9/5077; G06F 2009/4557; G06F
       2009/45583; G06F 9/5072; H04L
       41/0813; H04L 41/14; H04L 41/0816;
       H04L 41/50; H04L 41/00806; H04L
       12/46; H04L 67/10
  USPC ........................................... 709/226
  See application file for complete search history.

(56) References Cited

U.S. PATENT DOCUMENTS

| | | | | |
|---|---|---|---|---|
| 2004/0153908 | A1* | 8/2004 | Schiavone | G06F 21/6245 |
| | | | | 714/712 |
| 2012/0159232 | A1* | 6/2012 | Shimada | G06F 11/2028 |
| | | | | 714/3 |
| 2014/0201374 | A1* | 7/2014 | Ashwood-Smith | H04L 49/70 |
| | | | | 709/226 |
| 2014/0317261 | A1 | 10/2014 | Shatzkamer et al. | |
| 2014/0317293 | A1 | 10/2014 | Shatzkamer | |
| 2015/0172124 | A1* | 6/2015 | Piccinini | H04L 41/12 |
| | | | | 307/11 |
| 2015/0326535 | A1* | 11/2015 | Rao | H04L 63/029 |
| | | | | 726/15 |
| 2016/0147548 | A1 | 5/2016 | Itsumi et al. | |
| 2016/0179085 | A1* | 6/2016 | Seitz | G05B 19/414 |
| | | | | 700/180 |

FOREIGN PATENT DOCUMENTS

| | | | |
|---|---|---|---|
| WO | WO-2012054197 A2 * | 4/2012 | ......... G06F 9/45504 |
| WO | 2014/208661 A1 | 12/2014 | |

OTHER PUBLICATIONS

Communication dated Oct. 25, 2018, issued by the Korean Intellectual Property Office in corresponding Korean Application No. 10-2017-7023203.
Communication dated Dec. 12, 2017 from the European Patent Office in counterpart application No. 16743357.2.
ETSI Inductory Specification Group, "Network Functions Virtualisation (NFV), Architectural Framework", ETSI GS NFV 002 V1.2.1, Dec. 2014, pp. 13-18 [retrieval date: Apr. 7, 2016], Internet: <URL:://www.etsi.org/deliver/etsi_gs/NFV/001_099/002/01.02.01_60/gs_NFV002v010201p.pdf>.
International Search Report of PCT/JP2016/052174, dated Apr. 19, 2016. [PCT/ISA/210].
Communication issued Feb. 3, 2020 by the China National Intellectual Property Administration in application No. 201680007973.5.

* cited by examiner

FIG. 5

VM REQUEST SPECIFICATION DATABASE

| VM NAME | THE NUMBER OF CPU CORES | CPU CLOCK RATE | MEMORY CAPACITY | HARD DISK CAPACITY | THE NUMBER OF NICS |
|---|---|---|---|---|---|
| VM1 | A1 NUMBER | A2 [GHz] | A3 [GByte] | A4 [GByte] | A5 NUMBER |
| VM2 | B1 NUMBER | B2 [GHz] | B3 [GByte] | B4 [GByte] | B5 NUMBER |
| ... | ... | ... | ... | ... | ... |

FIG. 6

SERVER SPEC INFORMATION DATABASE

| SERVER | THE NUMBER OF CPU CORES | CPU CLOCK RATE | MEMORY CAPACITY | HARD DISK CAPACITY | THE NUMBER OF NICS |
|---|---|---|---|---|---|
| SERVER 31-1 | C1 NUMBER | C2 [GHz] | C3 [GByte] | C4 [GByte] | C5 NUMBER |
| SERVER 31-2 | D1 NUMBER | D2 [GHz] | D3 [GByte] | D4 [GByte] | D5 NUMBER |
| ... | ... | ... | ... | ... | ... |

FIG. 7

VM OPERATIONAL STATUS DATABASE

| SERVER | OPERATIONAL VM |
|---|---|
| SERVER 31-1 | VM1, VM2 |
| SERVER 31-2 | VM3, VM4 |
| ⋮ | ⋮ |

FIG. 10

SERVER SPEC INFORMATION DATABASE

| SERVER | THE NUMBER OF CPU CORES | CPU CLOCK RATE | MEMORY CAPACITY | HARD DISK CAPACITY | THE NUMBER OF NICS |
|---|---|---|---|---|---|
| SERVER 31-1 | C1 NUMBER | C2 [GHz] | C3 [GByte] | C4 [GByte] | C5 NUMBER |
| SERVER 31-2 | D1 NUMBER | D2 [GHz] | D3 [GByte] | D4 [GByte] | D5 NUMBER |
| ... | ... | ... | ... | ... | ... |
| SERVER 42 | E1 NUMBER | E2 [GHz] | E3 [GByte] | E4 [GByte] | E5 NUMBER |

SYSTEM, VIRTUALIZATION CONTROL APPARATUS, METHOD FOR CONTROLLING A VIRTUALIZATION CONTROL APPARATUS, AND PROGRAM

REFERENCE TO RELATED APPLICATION

This application is a National Stage of International Application No. PCT/JP2016/052174 filed Jan. 26, 2016, claiming priority based on Japanese Patent Application No. 2015-014615, filed Jan. 28, 2015, the contents of all of which are incorporated herein by reference in their entirety.

TECHNICAL FIELD

The present invention relates to a system, virtualization control apparatus, method for controlling a virtualization control apparatus, and program concerning network virtualization.

BACKGROUND

In recent years, in addition to the virtualization of the computing and storage of server devices, as a technology of virtualizing network functions, NFV (Network Functions Virtualization) that realizes network functions by means of software using an application running on a virtual machine (VM) implemented on a virtualization layer such as a hypervisor on a server is known. NFV is realized by a virtualization technology on a general-purpose server, as opposed to dedicated devices (for instance LTE (Long Term Evolution) mobile network node (for instance MME (Mobility Management Entity), P-GW (Packet data network Gateway), S-GW (Serving Gateway), etc.)), and the functions can be changed at any time. Further, communication services such as land-line telephone mobile communication, dedicated line, and inter-machine communication can be provided using a common network (for instance refer to Non-Patent Literature 1).

[Non-Patent Literature 1]
ETSI GS NFV 002 V1.2.1 (2014-12), Network Functions Virtualisation (NFV); Architectural Framework, pp. 13-18, searched on Jan. 20, 2015, the Internet <URL: http://www.etsi.org/deliver/etsi_gs/NFV/001_099/002/01.02.01_60/gs_NFV002v010201p.pdf>

SUMMARY

A related technology is analyzed below.

Due to demands to make a change in the service provided, enhance the processing capacity, or maintain facilities, a general-purpose server for running a virtual machine is sometimes added. At this time, if the added general-purpose server is simply connected to a network, the added general-purpose server will not be treated as a resource of the network to which NFV is applied. In other words, the hardware specifications of the added general-purpose server (for instance the performance of the CPU (Central Processing Unit), the memory capacity, etc.) should be registered in an apparatus that controls and manages the network to which NFV is applied (a virtualization control apparatus or MANO (Management and Network Orchestration) described later).

To address this, the network administrator can gather information of the added general-purpose server and enter the information into the apparatus. An NFV network, however, is normally constituted by a large number of general-purpose servers. Therefore, there is a limit that the network administrator gathers necessary information and registers it in the apparatus every time a general-purpose server is added to the network. More specifically, the network administrator may commit a human error such as mistaking the specifications of an added general-purpose server and registering the wrong information, or physically connecting a general-purpose server but not registering the general-purpose server.

If such a human error actually occurs, the virtualization control apparatus (MANO) will deploy a virtual machine on the basis of the wrong information, necessary network functions will not be achieved on the virtual machine, and this may cause a network failure. Further, unless the virtualization control apparatus (MANO) recognizes the presence of a general-purpose server, the network facilities will not be enhanced.

The present invention was created to solve the above problems, and it is a main object thereof to provide a system, virtualization control apparatus, method for controlling a virtualization control apparatus, and program that facilitate easy registration of general-purpose server information required to control a network to which NFV is applied.

According to a first aspect of the present invention, there is provided a system including a server that comprises a virtualization layer in which a hardware resource is virtualized; and a virtualization control apparatus that requests first information regarding the hardware resource to the server, registers second information corresponding to the first information acquired from the server, and uses the second information to control a network function (Virtual Network Function: VNF) implemented and virtualized by software operating on a virtual machine implemented on the virtualization layer.

According to a second aspect of the present invention, there is provided a virtualization control apparatus requesting first information regarding a hardware resource to a server that comprises a virtualization layer in which the hardware resource is virtualized; registering second information corresponding to the first information acquired from the server; and using the second information to control a network function (Virtual Network Function: VNF) implemented and virtualized by software operating on a virtual machine implemented on the virtualization layer.

According to a third aspect of the present invention, there is provided a method for controlling a virtualization control apparatus including requesting first information regarding a hardware resource to a server that comprises a virtualization layer in which the hardware resource is virtualized; registering second information corresponding to the first information acquired from the server; and using the second information to control a network function (Virtual Network Function: VNF) implemented and virtualized by software operating on a virtual machine implemented on the virtualization layer.

According to a fourth aspect of the present invention, there is provided a program having a computer that controls a virtualization control apparatus execute a process of requesting first information regarding a hardware resource to a server that comprises a virtualization layer in which the hardware resource is virtualized; a process of registering second information corresponding to the first information acquired from the server; and a process of using the second information to control a network function (Virtual Network Function: VNF) implemented and virtualized by software operating on a virtual machine implemented on the virtualization layer.

Further, this program can be stored in a computer-readable storage medium. The storage medium can be a non-transient one such as semiconductor memory, hard disk, and magnetic/optical storage medium. The present invention can be realized as a computer program product.

According to each aspect of the present invention, there is provided a system, virtualization control apparatus, method for controlling a virtualization control apparatus, and program that facilitate easy registration of general-purpose server information required to control a network to which NFV is applied.

BRIEF DESCRIPTION OF THE DRAWINGS

FIG. 5 is a drawing showing an example of a VM request specification database.

FIG. 6 is a drawing showing an example of a server spec information database.

FIG. 7 is a drawing showing an example of a VM operational status database.

FIG. 10 is a drawing showing an example of the server spec information database.

PREFERRED MODES

First, an outline of an exemplary embodiment will be given. It should be noted that drawing reference signs in the outline are given to each element as an example for convenience solely to facilitate understanding, and the description of the outline is not intended to limit the present invention.

A system relating to an exemplary embodiment includes a server 101 that comprises a virtualization layer in which a hardware resource is virtualized, and a virtualization control apparatus 102. The virtualization control apparatus 102 requests first information (for instance hardware resource information described later) regarding the hardware resource to the server 101, registers second information (for instance server spec information described later) corresponding to the first information acquired from the server 101, and uses the second information to control a network function (Virtual Network Function: VNF) implemented and virtualized by software operating on a virtual machine implemented on the virtualization layer.

For instance, when adding a server to an NFV network, the network administrator enters an instruction to add the server into the virtualization control apparatus 102. Having received the instruction, the virtualization control apparatus 102 asks the server 101 and acquires the hardware specifications (the first information) of the server 101. The virtualization control apparatus 102 generates information of the server 101 required to control the NFV network from the first information, and registers the information. Therefore, the network administrator does not have to gather the hardware specifications of the server 101 and enter it into the virtualization control apparatus 102. This facilitates registering general-purpose server information required to control a network to which NFV is applied.

Below, concrete exemplary embodiments will be further described in detail with reference to the drawings. It should be noted that the same signs are given to the same elements in each exemplary embodiment, and the explanation will be omitted.

First Exemplary Embodiment

A first exemplary embodiment will be described in detail with reference to the drawings.

<System Configuration>

Figure 1:
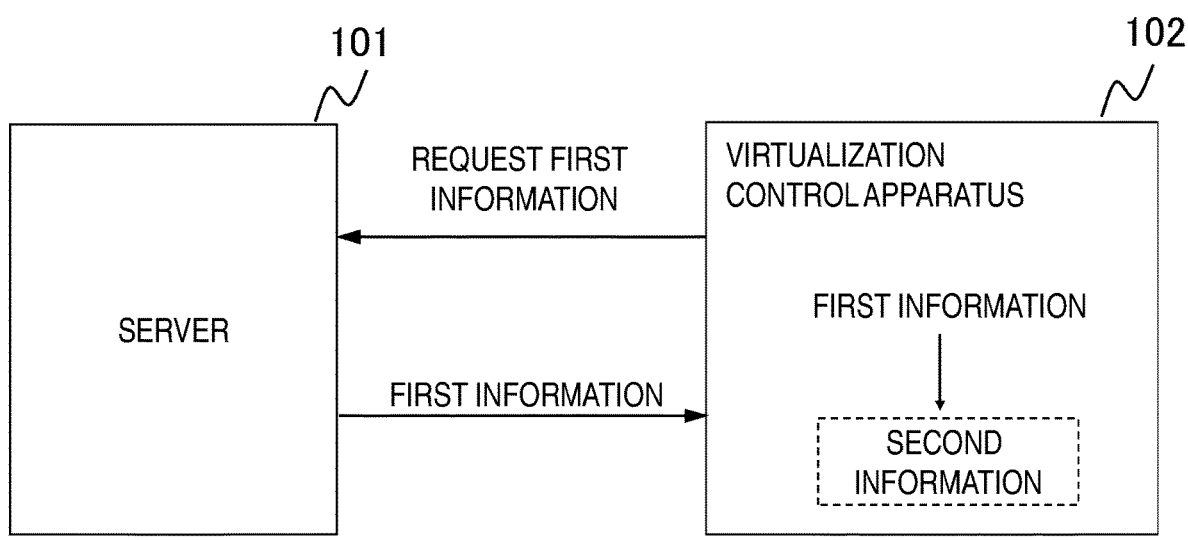
FIG. 1 is a drawing for explaining an outline of an exemplary embodiment.
Figure 2:
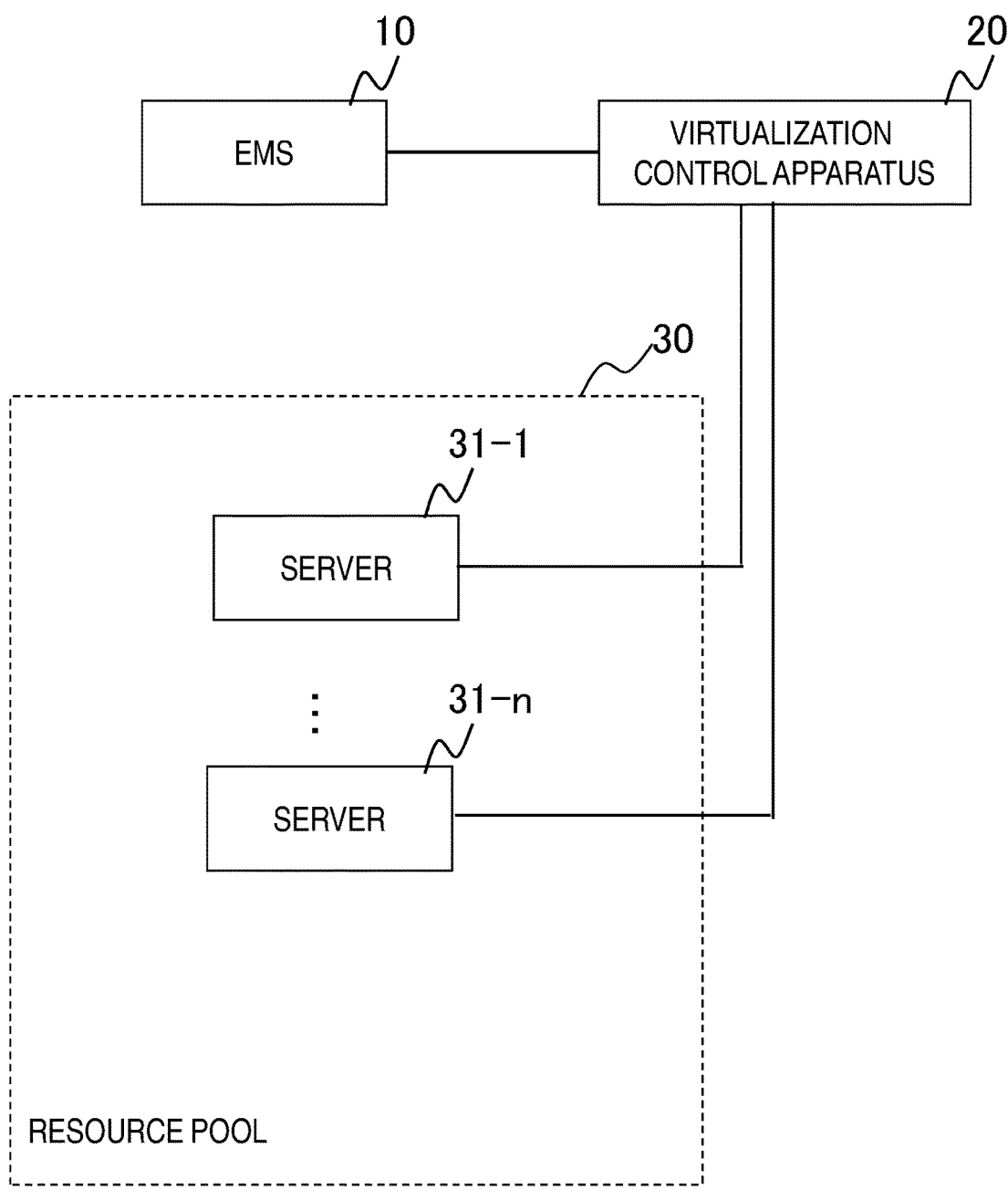
FIG. 2 is a drawing showing an example of a system configuration relating to a first exemplary embodiment.

FIG. 2 is a drawing showing an example of a system configuration relating to the first exemplary embodiment. The system shown in FIG. 2 includes an EMS (Element Management System) 10, a virtualization control apparatus 20, and a resource pool 30 constituted by a plurality of servers (physical machines). The resource pool 30 is constituted by servers 31-1 to 31-$n$ ($n$ is a positive integer; the same hereinafter). Further, the servers 31-1 to 31-$n$ will be simply referred to as the "server 31" when there is no particular need to distinguish between them.

The EMS 10 is a maintenance management system, and for instance it manages, configures, and maintains virtual machines. The EMS 10 communicates with the virtualization control apparatus 20.

The virtualization control apparatus 20 monitors and controls virtual machines on the server 31. For instance, the virtualization control apparatus 20 communicates with a virtualization layer such as a hypervisor of the server (physical machine or physical server) 31, and exchanges information regarding the configuration and state of virtual machines (VM) and information regarding the configuration and state of virtualized hardware resources such as a virtualized CPU assigned to a virtual machine, deploying and controlling virtual machines, and communicating with the EMS 10.

The resource pool 30 is a group that manages resources of the servers 31-1 to 31-$n$. It should be noted that, although FIG. 2 shows a single resource group controlled and managed by the virtualization control apparatus 20, it is not intended to limit the number of resource groups controlled and managed by the virtualization control apparatus 20.

<Server>

Figure 3:
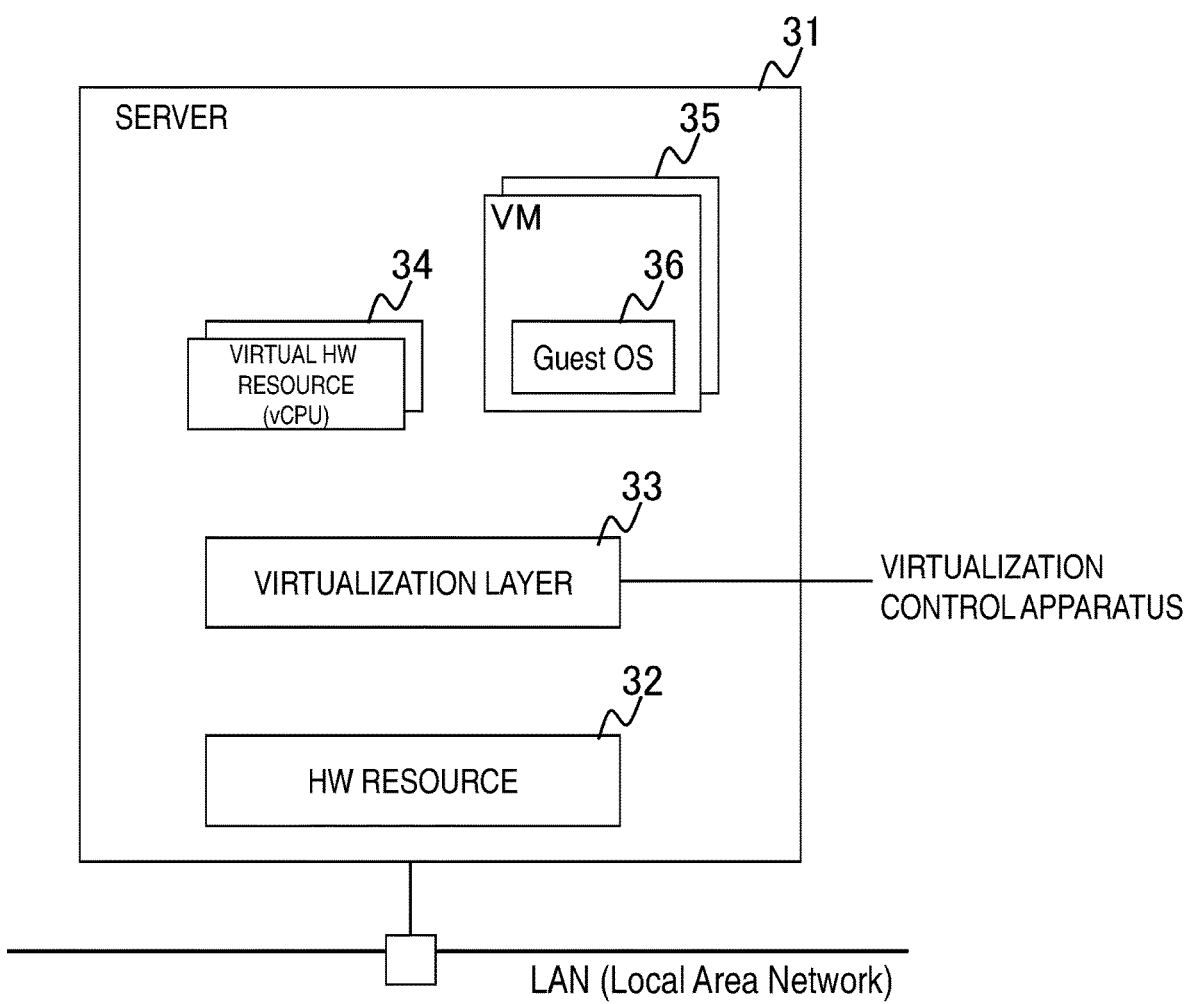
FIG. 3 is a drawing showing a configuration example of a server relating to the first exemplary embodiment.

FIG. 3 is a drawing showing a configuration example of the server 31. In FIG. 3, the server 31 comprises a hardware (HW) resource 32 such as computing hardware (for instance CPU core), storage hardware (HDD (Hard Disk Drive), RAM (Random Access Memory), etc.), and network hardware. The server 31 further comprises a virtualization layer 33 such as a hypervisor constituting a virtual function, a virtual hardware resource 34 such as a virtual CPU (vCPU)

obtained by virtualizing the hardware resource 32 using the virtualization layer 33, and a virtual machine 35. The virtual machine 35 executes an application (not shown in the drawing) on a guest OS 36, and for instance realizes the virtualization (NFV) of a network function (NF).

The network function realized on the virtual machine 35 of the server 31 runs over a network to which NFV is applied. The hardware specifications (for instance the number of CPU cores, etc.) of the server 31 are registered as server spec information in the virtualization control apparatus 20. The virtualization control apparatus 20 deploys the virtual machine 35 to the server 31 and controls the application on the guest OS 36 on the basis of this server spec information.

<Virtualization Control Apparatus>

Figure 4:
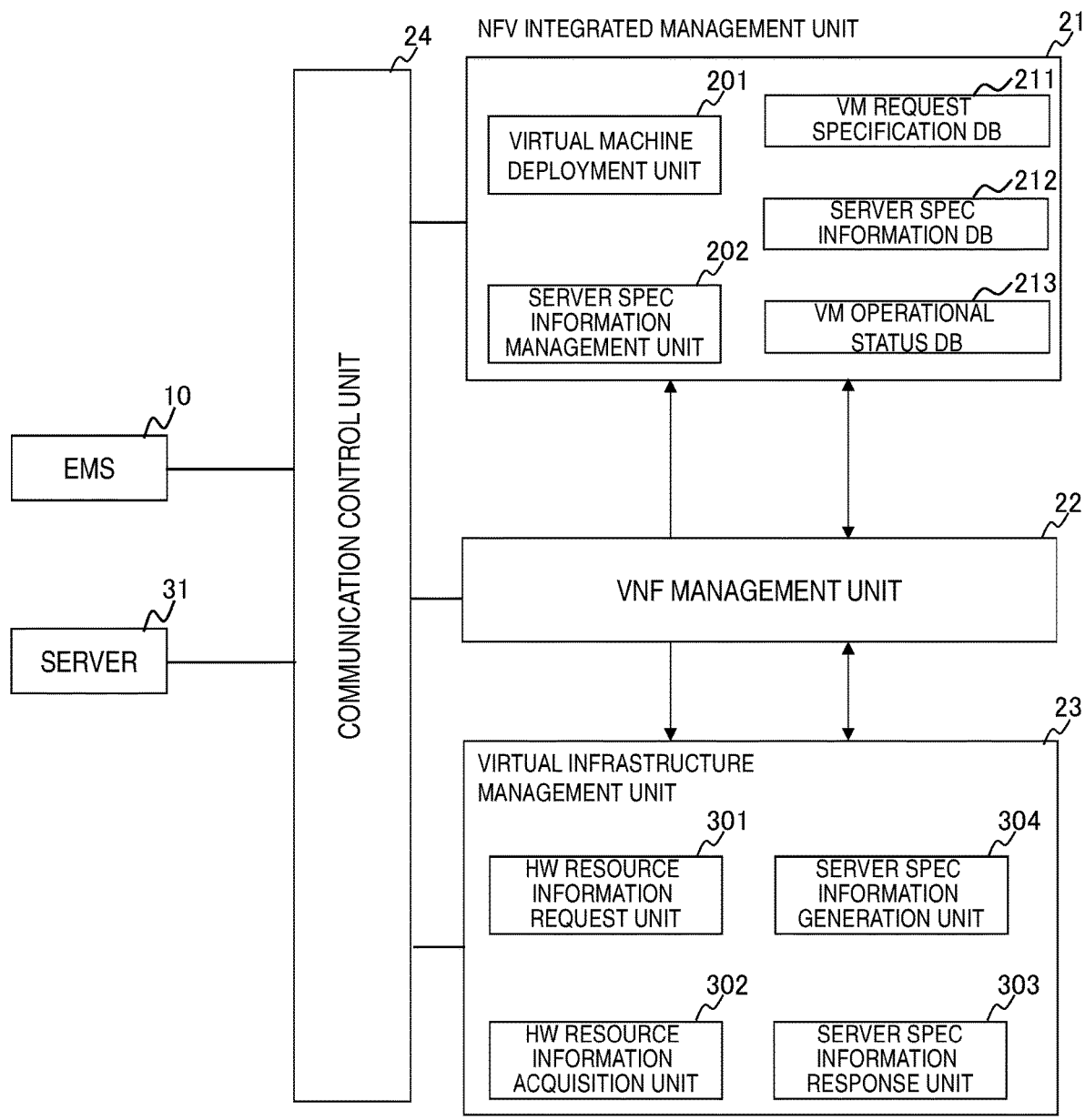
FIG. 4 is a drawing showing a configuration example of a virtualization control apparatus relating to the first exemplary embodiment.

FIG. 4 is a drawing showing a configuration example of the virtualization control apparatus 20. In FIG. 4, the virtualization control apparatus 20 comprises an NFV integrated management unit 21, a VNF management unit 22, a virtual infrastructure management unit 23, and a communication control unit 24.

The NFV integrated management unit 21 orchestrates and manages a VNF, and NFVI (Network Function Virtualization Infrastructure) forming an execution infrastructure therefor. Note that the NFVI forming the execution infrastructure for the VNF is an infrastructure on which, for instance, the computing, storage, and network functions included in the hardware resource 32 of the server 31 can flexibly treated as the virtual hardware resource 34 virtualized by the virtualization layer 33.

The NFV integrated management unit 21 realizes a network service on the NFVI. More concretely, the NFV integrated management unit 21 allocates resources to a VNF as an application executed by the virtual machine 35 of the server 31, manages the VNF (auto-healing, auto-scaling), and manages a life cycle of the VNF.

The NFV integrated management unit 21 includes a virtual machine deployment unit 201, a server spec information management unit 202, a VM request specification database (DB) 211, a server spec information database 212, and a VM operational status database 213.

The virtual machine deployment unit 201 is means for deploying a virtual machine on the server 31 included in the resource pool 30 on the basis of an instruction from the network administrator via the EMS 10. At this time, the virtual machine deployment unit 201 deploys a virtual machine on the server 31 using the information registered in each of the databases mentioned above.

The server spec information management unit 202 is means for managing the server spec information of the server 31 included in the resource pool 30. For instance, the network administrator instructs the virtualization control apparatus 20 to add a server to the resource pool 30 via the EMS 10. The server spec information management unit 202 requests the virtual infrastructure management unit 23 to transmit the server spec information of the added server according to this instruction (referred to as the "server spec information transmission request" hereinafter). The server spec information management unit 202 acquires the server spec information of the added server as a response from the virtual infrastructure management unit 23, and registers this information in the server spec information database 212 as the server spec information of the server added to the resource pool 30.

The VM request specification database 211 is means for storing specifications requested by each virtual machine constructed in the server 31. FIG. 5 is a drawing showing an example of the VM request specification database 211. In FIG. 5, the VM request specification database 211 stores, for instance, information such as the number of CPU cores, CPU clock rate, memory and hard disk capacities, and the number of NICs (Network Interface Cards) required to construct a virtual machine on the server 31.

The server spec information database 212 is means for storing the server spec information obtained by the server spec information management unit 202 as described above. FIG. 6 is a drawing showing an example of the server spec information database 212. As shown in FIG. 6, the server spec information database 212 stores the hardware spec of the server 31 included in the resource pool 30. Further, the fields constituting the server spec information database 212 include at least the fields constituting the VM request specification database 211. For instance, if the VM request specification database 211 includes fields related to "the number of CPU cores" and "the CPU clock rate," the server spec information database 212 includes at least these two fields.

The VM operational status database 213 is means for storing information regarding virtual machines constructed on each server. FIG. 7 is a drawing showing an example of the VM operational status database 213. As shown in FIG. 7, the VM operational status database 213 records virtual machines running on each server.

With reference to FIG. 4, the VNF management unit 22 performs life-cycle management of a VNF (instantiation, update, query, scaling, termination, etc.) and event notification. For instance, the VNF management unit 22 deploys the virtual machine 35 on the server 31 via the virtualization layer 33 of the server 31.

The virtual infrastructure management unit 23 manages and controls the resources of the NFVI. More concretely, the virtual infrastructure management unit 23 manages resources such as computing, storage, and network functions included in the hardware resource 32 of the server 31 (resource allocation as requested, resource information monitoring, etc.). The NFVI resource management performed by the virtual infrastructure management unit 23 includes acquiring information regarding the hardware resource 32 of the server 31 (referred to the "hardware resource information" hereinafter) and notifying the NFV integrated management unit 21 of this information.

The virtual infrastructure management unit 23 includes a hardware (HW) resource information request unit 301, a hardware resource information acquisition unit 302, a server spec information generation unit 303, and a server spec information response unit 304.

The hardware resource information request unit 301 specifies a server, and requests the virtualization layer 33 of the specified server to transmit the hardware resource information.

The hardware resource information acquisition unit 302 acquires the hardware resource information transmitted by the virtualization layer 33 of the specified server. The hardware resource information acquisition unit 302 hands over the acquired hardware resource information to the server spec information generation unit 303.

The server spec information generation unit 303 generates the server spec information according to the acquired hardware resource information. The server spec information generation unit 303 hands over the generated server spec information to the server spec information response unit 304.

The server spec information response unit 304 transmits the acquired server spec information to the server spec information management unit 202 as a response to a request (server spec information transmission request) from the server spec information management unit 202.

The communication control unit 24 controls communication with the EMS 10 and the server 31. It should be noted that, although FIG. 4 discloses a configuration in which the communication control unit 24 controls communication with the EMS 10 and the server 31, a communication control unit may be provided for each communication destination.

Figure 8:
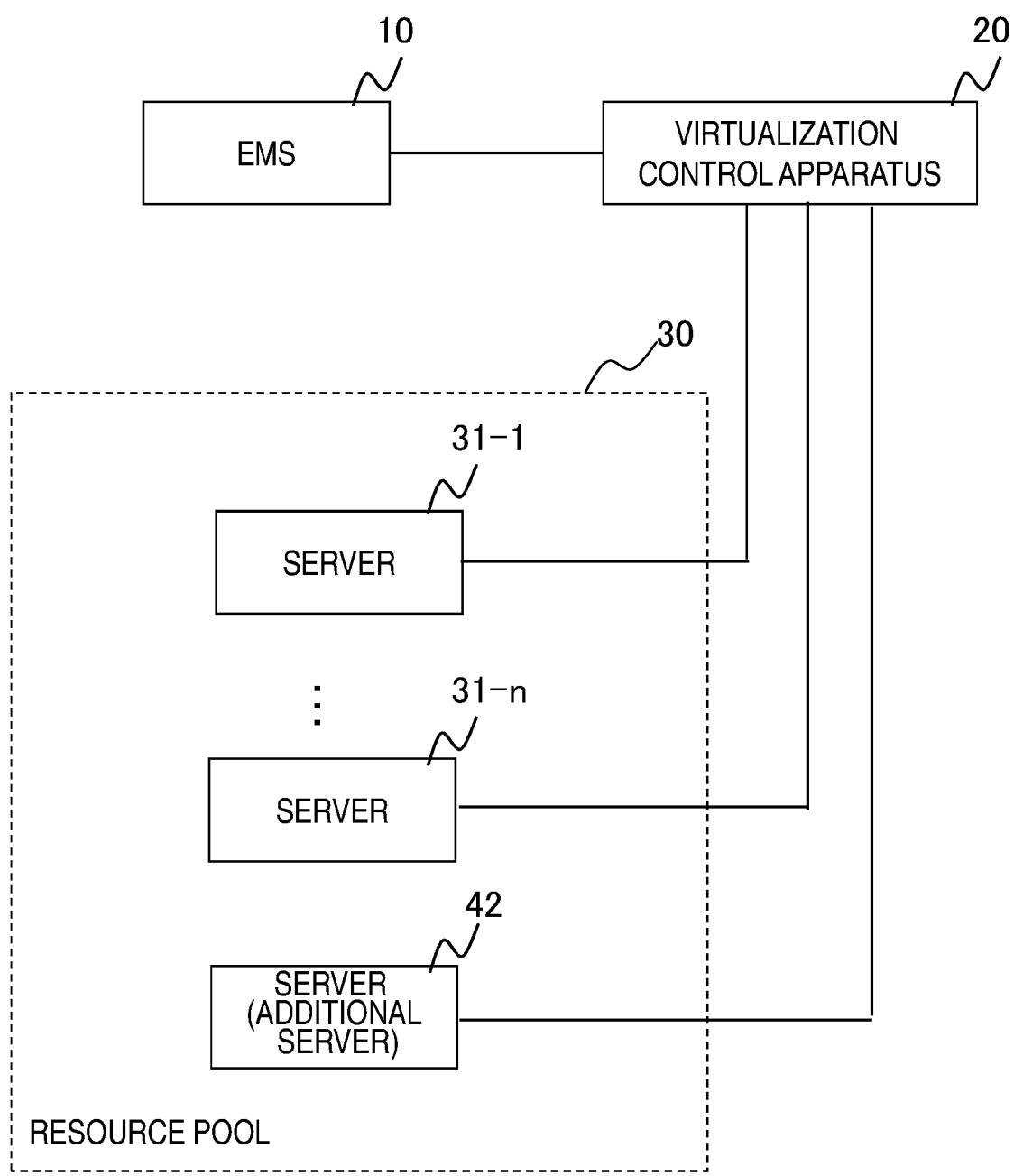
FIG. 8 is a drawing showing an example of a system configuration relating to the first exemplary embodiment.
Figure 9:
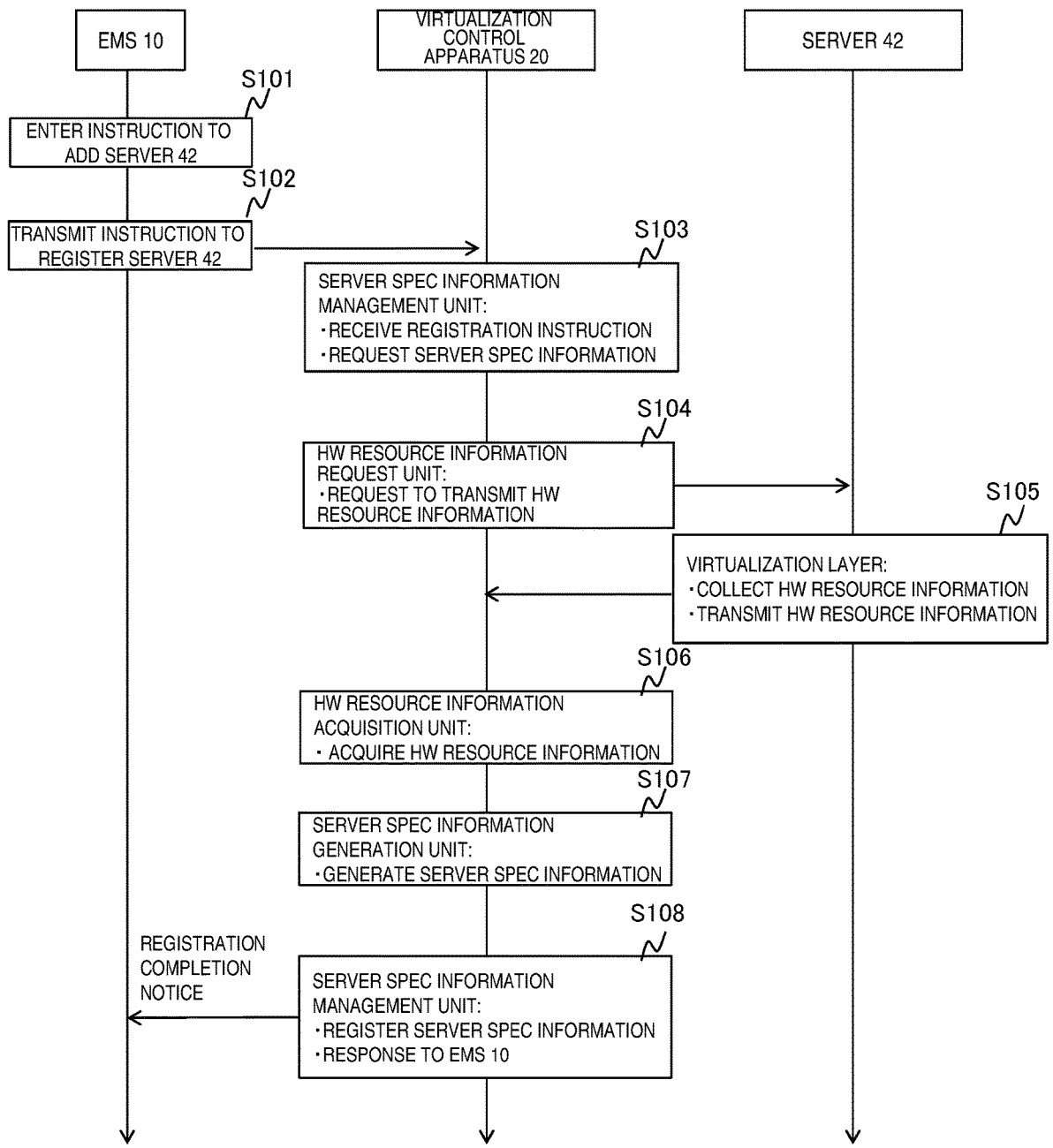
FIG. 9 is an example of a sequence diagram for explaining the operation when server spec information is registered in the virtualization control apparatus.

Next, an operation of the system relating to the first exemplary embodiment when a server 42 is added to the resource pool 30, as shown in FIG. 8, will be described with reference to FIG. 9. Since the basic configuration of the server 42 is the same as that of the server 31, the explanation will be omitted.

The network administrator instructs the EMS 10 to add (register) the server 42 to the resource pool 30. For instance, the network administrator enters the IP (Internet Protocol) address assigned to the server 42 into the EMS 10, instructing it to register the server having this IP address in the resource pool 30 (step S101).

The EMS 10 transmits an instruction to the virtualization control apparatus 20 to register the server 42, having the IP address of the server 42 (step S102).

The server spec information management unit 202 of the virtualization control apparatus 20 receives the registration instruction from the EMS 10 via the communication control unit 24. The server spec information management unit 202 requests the virtual infrastructure management unit 23 to transmit the server spec information, sending the IP address of the server 42 (step S103).

The hardware resource information request unit 301 of the virtual infrastructure management unit 23 requests the virtualization layer 33 of the server 42 to transmit the hardware resource information (step S104).

Upon receiving the request to transmit the hardware resource information, the virtualization layer 33 collects the hardware resource information of its own server (the server 42). The virtualization layer 33 collects the hardware resource information by referring to a file having information regarding the hardware resource 32 or utilizing an OS (Operation System) command for acquiring information regarding the hardware resource 32. The virtualization layer 33 transmits the collected hardware resource information to the virtualization control apparatus 20 (step S105).

For instance, the hardware resource information collected by the virtualization layer 33 includes: (1) host name; (2) OS information; (3) CPU information (CPU rate, the number of physical cores); (4) memory information; (5) disk capacity information; and (6) NIC (Network Interface Card) information (the number of physical NICs, available bandwidth). In other words, the hardware resource information collected by the virtualization layer 33 includes information regarding computing hardware such as the CPU clock rate and the number of physical cores, storage hardware such as the memory capacity, and network hardware such as the number of physical NICs.

The hardware resource information acquisition unit 302 of the virtualization control apparatus 20 receives the hardware resource information transmitted by the server 42 via the communication control unit 24 and hands over the information to the server spec information generation unit 303 (step S106).

The server spec information generation unit 303 generates the server spec information on the basis of the acquired hardware resource information. More specifically, the server spec information generation unit 303 generates the server spec information by selecting information required to generate the server spec information from the acquired hardware resource information and converting this information into a predetermined format (step S107). The server spec information generation unit 303 hands over the generated server spec information to the server spec information response unit 304.

Here, if the servers have different specifications, the contents of the hardware resource information transmitted by each server will widely vary. In other words, some servers may transmit information not required by the NFV integrated management unit 21 as the hardware resource information. Therefore, the server spec information generation unit 303 selects information required by the NFV integrated management unit 21 from the acquired hardware resource information. Further, even when the same information is indicated, the representation format may be different. In this case, the server spec information generation unit 303 converts the information included in the acquired hardware resource information into a unified format. By performing the processing described above, the server spec information generation unit 303 generates the information (server spec information) required by the NFV integrated management unit 21 from the hardware resource information.

If the hardware resource information transmitted by a server can be used as the server spec information without any processing thereon, the server spec information generation unit 303 does not have to perform any processing. In other words, there may be cases where the server spec information is the same as the hardware resource information.

The server spec information response unit 304 transmits the server spec information to the server spec information management unit 202 as a response to the server spec information transmission request. The server spec information management unit 202 acquires the server spec information and registers the acquired server spec information in the server spec information database 212 (adding an entry to the database; refer to FIG. 10). Further, the server spec information management unit 202 notifies the EMS 10 that the server 42 has been added to the resource pool 30 (step S108).

Figure 11:
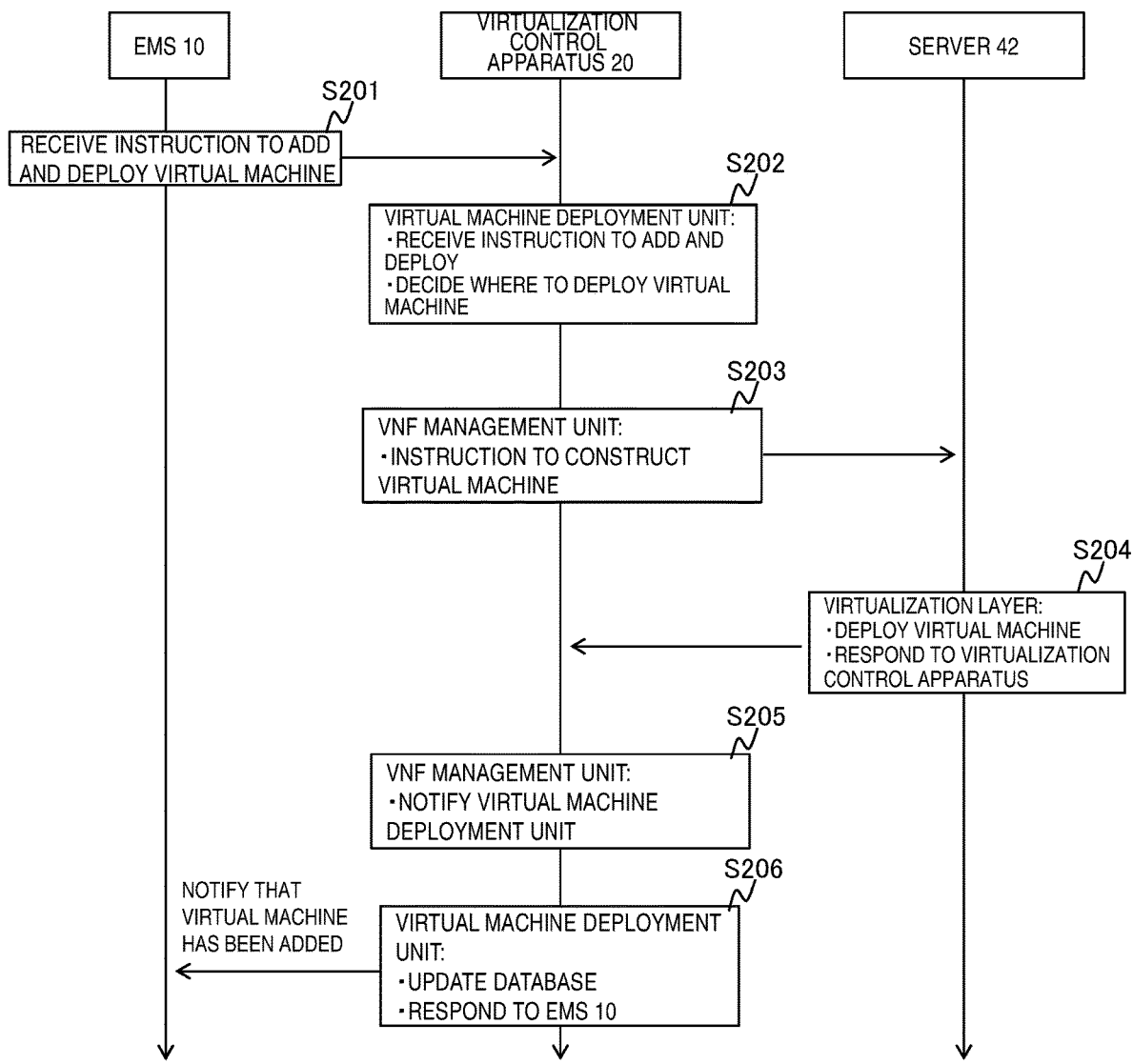
FIG. 11 is a sequence diagram showing an example of the operation in which a virtual machine is added to and deployed in a resource pool in the system relating to the first exemplary embodiment.

Next, an operation when a virtual machine is added to and deployed in the resource pool 30 will be described with reference to FIG. 11. FIG. 11 is a sequence diagram showing an example of the operation in which a virtual machine VM2 is added to and deployed in the resource pool 30 in the system of the exemplary embodiment in FIGS. 2, 3, and 8.

The EMS 10 receives an instruction from the network administrator to add the virtual machine VM2 to the resource pool 30 and deploy it therein (step S201).

The virtual machine deployment unit 201 receives an instruction to add and deploy the virtual machine VM2 from the EMS 10 via the communication control unit 24. The virtual machine deployment unit 201 refers to the VM request specification database 211, the server spec information database 212, and the VM operational status database 213 and determines where the virtual machine VM2 is deployed (step S202).

The virtual machine deployment unit 201 accesses the VM operational status database 213 and acquires information regarding the operational status of virtual machines on each server (the servers 31-1 to 31-$n$ and 42) of the resource pool 30. The virtual machine deployment unit 201 accesses the VM request specification database 211 and acquires information regarding the resources required by each virtual machine. The virtual machine deployment unit 201 accesses the server spec information database 212 and acquires the hardware spec of each server. The virtual machine deployment unit 201 calculates the available resource information of each server on the basis of the information acquirable from the three databases.

For instance, with reference to FIG. 7, virtual machines VM1 and VM2 are constructed and operating in the server 31-1. Further, with reference to FIG. 5, A1 number of CPU cores and B1 number of CPU cores are required to operate each of the virtual machines VM1 and VM2, respectively. Further, FIG. 10 indicates that the server 31-1 has C1 number of CPU cores. Therefore, the virtual machine deployment unit 201 can calculate the available resources of the server 31-1 regarding the number of CPU cores as follows. C1−(A1+B1). The virtual machine deployment unit 201 calculates the available resources of each server (the servers 31-1 to 31-$n$ and 42) as described above.

For instance, the virtual machine deployment unit 201 chooses a server with a large amount of available resources as the place in which a virtual machine is deployed. If this is immediately after the server 42 has been added to the resource pool 30 and no virtual machine has been constructed in the server 42, it is likely that the server 42 has the largest amount of available resources. Let us assume that the virtual machine deployment unit 201 decides to deploy the virtual machine VM2 on the server 42. The virtual machine deployment unit 201 instructs the VNF management unit 22 to construct the virtual machine VM2 in the server 42.

Upon receiving this instruction, the VNF management unit 22 instructs the virtualization layer 33 of the server 42 to construct the virtual machine VM2 (step S203).

The virtualization layer 33 of the server 42 constructs the virtual machine VM2 as instructed, and after the construction of the virtual machine VM2 has been completed, the virtualization layer 33 sends a response stating so to the virtualization control apparatus 20 (step S204).

The VNF management unit 22 notifies the virtual machine deployment unit 201 that the virtual machine VM2 has been constructed on the server 42 (step S205).

The virtual machine deployment unit 201 adds a new entry to the VM operational status database 213, registering the information that the virtual machine VM2 is running on the server 42 (or updating the VM operational status database 213). Further, the virtual machine deployment unit 201 responds to the EMS 10 via the communication control unit 24, stating that the virtual machine VM2 has been constructed on the server 42 (step S206).

As described, the virtualization control apparatus 20 relating to the first exemplary embodiment requests an added server to provide hardware resource information according to an instruction to add a server from the network administrator. The virtualization control apparatus 20 suitably processes acquired hardware resource information and generates information (server spec information) for controlling a network to which an NFV is applied. Further, the virtualization control apparatus 20 utilizes an association between a server and the server spec information of the server to control an NFV network by registering this association in a database. This will eliminate the necessity for the network administrator to collect the required information (hardware resource information, server spec information), facilitating registration of a general-purpose server.

Second Exemplary Embodiment

Next, a second exemplary embodiment will be described in detail with reference to the drawings.

The first exemplary embodiment described the case where the server spec information of an added server is registered in the virtualization control apparatus 20 when the server is added to the resource pool 30. The second exemplary embodiment describes a case where a change in the hardware spec of an existing server is reflected in the server spec information database 212 when the change occurs. Since the configurations of the servers 31 and 42, and the virtualization control apparatus 20 relating to the second exemplary embodiment are as described in the first exemplary embodiment, the explanation equivalent to FIGS. 3 and 4 will be omitted.

The server spec information management unit 202 requests the hardware resource information request unit 301 to transmit the server spec information regarding each server according to a predetermine rule (a predetermined period or predetermined timing). In the second exemplary embodiment, it is assumed that the server spec information management unit 202 requests the server spec information to be transmitted on a regular basis. Upon receiving a request to transmit the server spec information, the hardware resource information request unit 301 requests each server to transmit the hardware resource information.

Upon receiving the request from the virtualization control apparatus 20 to transmit the hardware resource information, the virtualization layer 33 of the servers 31 and 42 collects the hardware resource information of the their own servers (servers 31 and 42), respectively. More specifically, the virtualization layer 33 collects the hardware resource information by referring to a predetermined file or issuing a predetermined command as described above. The virtualization layer 33 transmits the collected hardware resource information to the virtualization control apparatus 20.

The hardware resource information acquisition unit 302 determines if anything in the hardware resource information acquired from the servers 31 and 42 has changed from the hardware resource information acquired from the same servers in the past. When determining that there is no change in the hardware resources 32 of the servers 31 and 42, the hardware resource information acquisition unit 302 sends a response stating so to the server spec information management unit 202 via the server spec information response unit 304. The server spec information management unit 202 does not perform any processing after receiving the notification that there is no change in the hardware resources 32 of the servers 31 and 42.

When determining that there is a change in the hardware resource information acquired from the servers 31 and 42, the hardware resource information acquisition unit 302 hands over the hardware resource information after the change (the latest hardware resource information) to the server spec information generation unit 303. A change in the hardware resources 32 of the servers 31 and 42 may be caused by a hardware failure such as degradation in the CPU or memory or a physical NIC failure. Further, adding or changing memory and a physical NIC may cause a change in the hardware resource 32.

As in the first exemplary embodiment, the server spec information generation unit 303 generates the server spec information on the basis of the latest hardware resource information and transmits the information to the server spec information management unit 202 via the server spec information response unit 304.

The server spec information management unit 202 updates the server spec information database 212 according to the server spec information received from the server spec information response unit 304.

Figure 12:
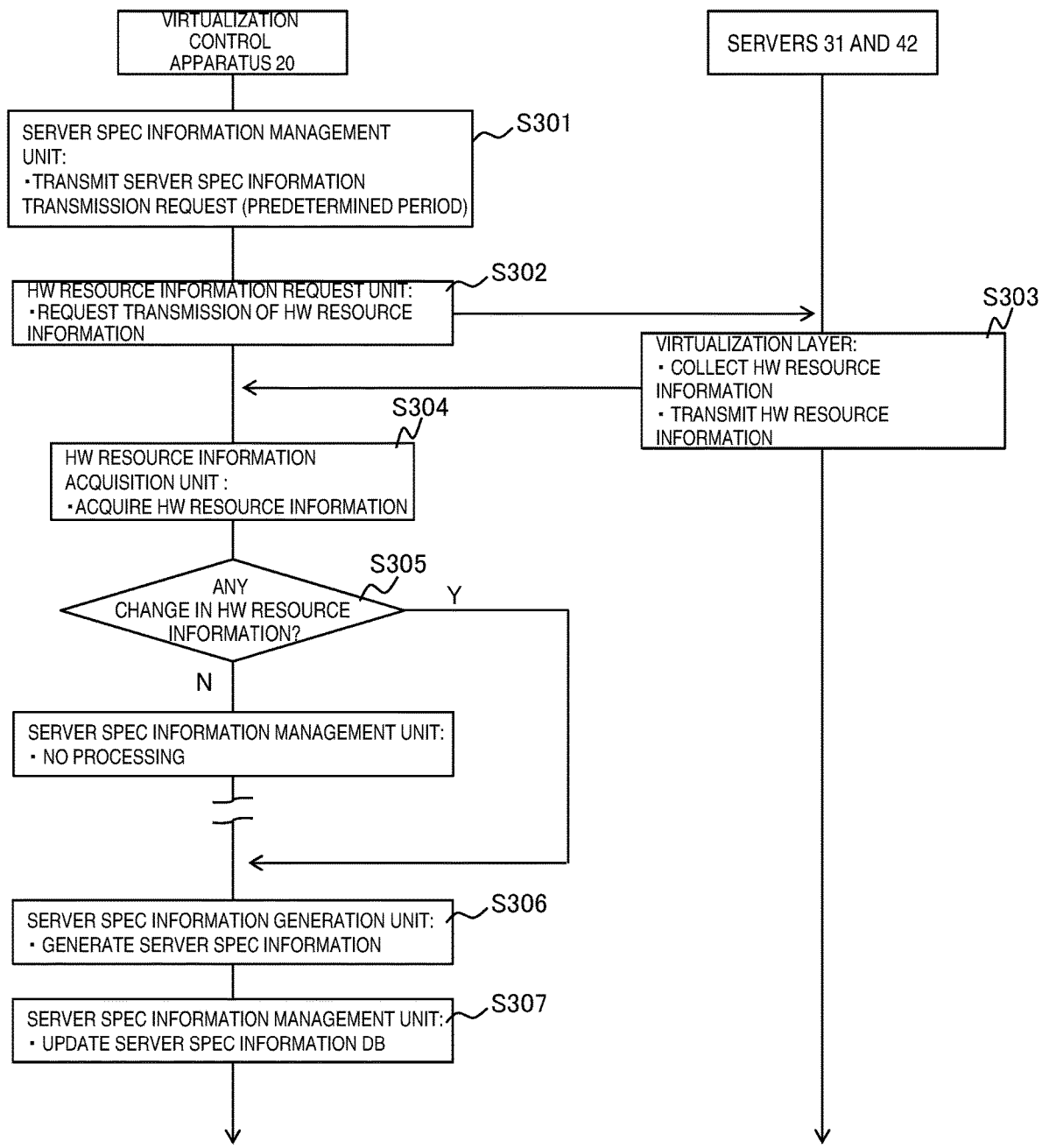
FIG. 12 is a sequence diagram showing an example of the operation of a system relating to a second exemplary embodiment.

Next, an operation of the system relating to the second exemplary embodiment will be described with reference to FIG. 12.

The server spec information management unit 202 of the virtualization control apparatus 20 requests the hardware resource information request unit 301 to transmit the server spec information of each server on a regular basis (step S301). Upon receiving the server spec information transmission request, the hardware resource information request unit 301 requests each server to transmit the hardware resource information (step S302).

The virtualization layers 33 of the servers 31 and 42 collect the hardware resource information of their own servers and transmit the collected hardware resource information to the virtualization control apparatus 20 (step S303).

The hardware resource information acquisition unit 302 of the virtualization control apparatus 20 acquires the hardware resource information from each of the server 31 and 42 (step S304).

Next, the hardware resource information acquisition unit 302 determines if anything in the hardware resource information acquired in the previous step is different from the hardware resource information acquired from the same servers in the past (step S305).

When there is no change in the hardware resource information ("No" in the step S305), the hardware resource information acquisition unit 302 sends a response stating that there is no change in the hardware spec to the server spec information management unit 202 via the server spec information response unit 304. In this case, the server spec information management unit 202 of the virtualization control apparatus 20 does not perform any processing.

When there is a change in the hardware resource information ("Yes" in the step S305), the hardware resource information acquisition unit 302 hands over the latest hardware resource information to the server spec information generation unit 303. The server spec information generation unit 303 generates the server spec information on the basis of the acquired hardware resource information (the latest hardware resource information) (step S306).

The server spec information management unit 202 updates the server spec information database 212 according to the server spec information generated on the basis of the latest hardware resource information (step S307).

As described, the virtualization control apparatus 20 relating to the second exemplary embodiment asks each server on a regular basis whether or not any change in the hardware spec has occurred, and when there is a change in the hardware spec, the virtualization control apparatus 20 is able to automatically register the server spec information after the change.

Third Exemplary Embodiment

Next, a third exemplary embodiment will be described in detail with reference to the drawings.

The maintenance management of the resource pool 30 includes reducing (removing) servers. The third exemplary embodiment explains how an entry regarding a server is deleted from the server spec information database 212 when the server is removed from the resource pool 30. Since the configurations of the servers 31 and 42, and the virtualization control apparatus 20 relating to the third exemplary embodiment are as described in the first exemplary embodiment, the explanation equivalent to FIGS. 3 and 4 will be omitted.

Figure 13:
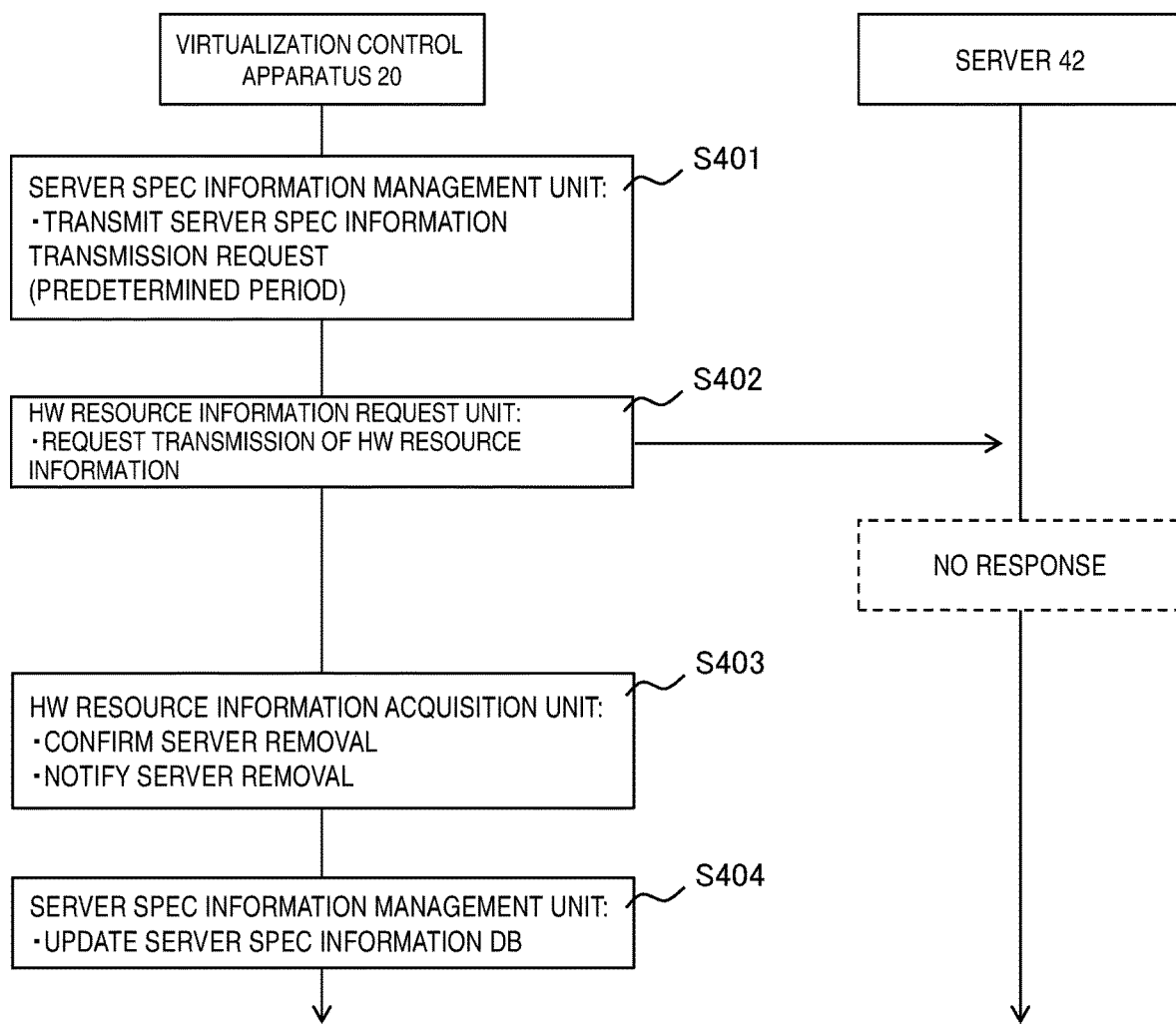
FIG. 13 is a sequence diagram showing an example of the operation of a system relating to a third exemplary embodiment.

With reference to FIG. 13, an operation of removing the server 42 from the resource pool 30 will be described.

The server spec information management unit 202 of the virtualization control apparatus 20 requests the hardware resource information request unit 301 to transmit the server spec information of each server on a regular basis (step S401). Upon receiving a request to transmit the server spec information, the hardware resource information request unit 301 requests each server to transmit the hardware resource information (step S402). In this case, it is assumed that the hardware resource information request unit 301 has requested the removed server 42 to transmit the hardware resource information.

Since the server 42 has been removed, there is no response from the server 42.

The hardware resource information acquisition unit 302 confirms the removal of the server 42 when it is unable to receive any hardware resource information from the server 42 after a predetermined period of time (step S403). The hardware resource information acquisition unit 302 notifies the server spec information management unit 202 of the removal of the server 42 via the server spec information response unit 304.

The server spec information management unit 202 updates the server spec information database 212 according to the notification regarding the removal of the server 42. More specifically, the server spec information management unit 202 deletes the entry regarding the server 42 shown in FIG. 10.

As described, when a server is removed from the resource pool, the virtualization control apparatus 20 automatically deletes the server spec information corresponding to the removed server. As a result, the resources of the virtualization control apparatus 20 can be utilized efficiently.

<Correspondence Relation to the NFV Reference Architectural Framework>

Figure 14:
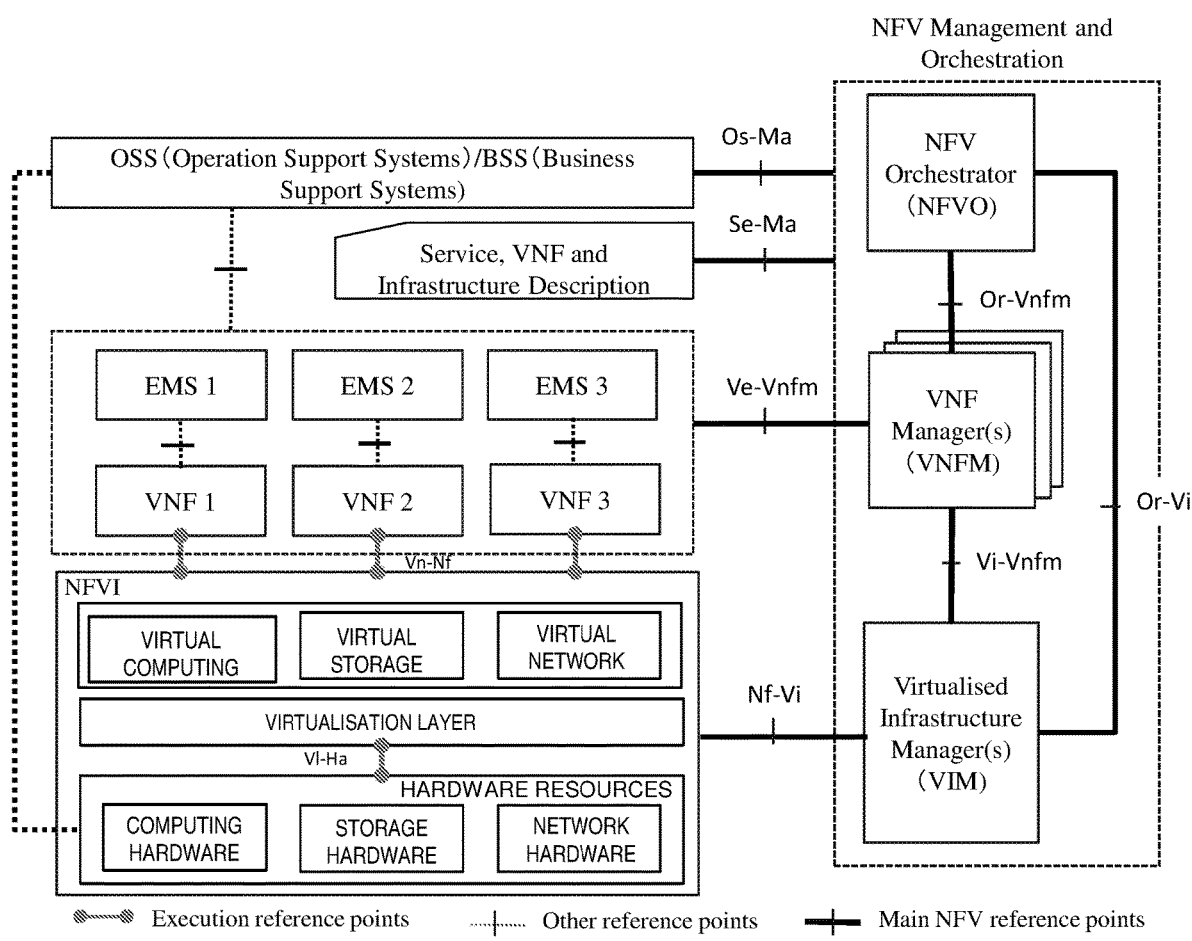
FIG. 14 is a drawing for explaining NFV.

FIG. 14 is taken from FIG. 4 in Chapter 7 of Non-Patent Literature as a reference and shows the NFV reference architectural framework defined by the NFV (Network Function Virtualization) ISG (Industry Specification Groups).

The server 31 of the first exemplary embodiment described with reference to FIGS. 2 and 3 corresponds to the NFV architecture as follows.

In FIG. 14, VNFs (Virtual Network Functions) 1 to 3 correspond to, for instance, the application running on the virtual machine (VM) 35 in FIG. 3. For the VNFs 1 to 3, the network functions (for instance the MME (Mobility Management Entity), S-GW (Serving Gateway), P-GW (PDN Gateway), etc., of the EPC (Evolved Packet Core), the core network of the LTE (Long Term Evolution) network) may be realized by software (virtual machine). The NFV ISG defines a management function called EMS (Element Management System) for each VNF.

Further, in the NFV architecture shown in FIG. 14, an NFVI (Network Function Virtualization Infrastructure) forming an execution infrastructure for the VNFs is an infrastructure on which the hardware resources (for instance the hardware resource 32) of a physical machine (server) such as computing, storage, and network functions can flexibly treated as virtual hardware resources (the virtual hardware resource 34 in FIG. 2) such as virtual computing, virtual storage, and virtual network virtualized by a virtualization layer (for instance the virtualization layer 33 in FIG. 3) such as a hypervisor.

Further, the virtualization control apparatus 20 in FIGS. 2 and 4 can correspond to an NFV Management and Network Orchestration (MANO) of the NFV reference architecture in FIG. 14. In FIG. 14, the NFV MANO comprises an NFV-Orchestrator (NFVO), VNF-Manager (VNFM), and Virtualized Infrastructure Manager (VIM).

The NFV integrated management unit 21 shown in FIG. 4 corresponds to the NFV-Orchestrator (NFVO). The NFV-Orchestrator (NFVO) orchestrates and manages the NFVI and the VNFs, and realizes network services on the NFVI (resource allocation to the VNFs, and VNF management (auto-healing, auto-scaling, life cycle management of the VNFs, etc.)).

The VNF management unit 22 shown in FIG. 4 corresponds to the VNF-Manager (VNFM). The VNF-Manager (VNFM) manages the life cycle of the VNFs (instantiation, update, query, scaling, termination, etc.).

The virtual infrastructure management unit 23 shown in FIG. 4 corresponds to the Virtualized Infrastructure Manager (VIM). The Virtualized Infrastructure Manager (VIM) controls the NFVI via the virtualization layer (computing, storage, network resource management, failure monitoring for the NFVI, which is the execution infrastructure for NFV, resource information monitoring, etc.).

Service, VNF and Infrastructure Description provide, for instance, information regarding the VNF deployment template, VNF Forwarding Graph (describing the topology and allocation of network services), service-related information, and NFV infrastructure information models.

OSS (Operation Support Systems) is a generic term for systems (equipment, software, mechanism, etc.) required for, for instance, telecommunications carriers to construct and operate services. BSS (Business Support Systems) is a generic term for information systems (equipment, software, mechanism, etc.) that, for instance, telecommunications carriers use for billing and charging usage fees and customer services.

In FIG. 14, Os-Ma is a reference point between OSS (Operation Support Systems)/BSS (Business Support Systems) and the NFV-MANO, and is used for requests for network service lifecycle management, requests for VNF lifecycle management, forwarding of NFV related state information, policy management exchanges, etc. A reference point Or-Vnfm is used for resource related requests (authorization, reservation, allocation, etc.) by the VNF Manager (VNFM), forwarding configuration information to the VNFM, and collecting state information of the VNF. A reference point Vi-Vnfm is used for resource allocation requests by the VNFM, and virtualized resource configuration and state information exchange. A reference point Or-Vi is used for resource reservation and/or allocation requests by the NFVO, and virtualized resource configuration and state information exchange.

A reference point Ve-Vnfm is used for requests for VNF lifecycle management, and exchanging configuration information and state information between the EMS and the VNFM. A reference point Nf-Vi is used for specific assignment of virtualized resources in response to resource allocation requests, forwarding of virtualized resources state information, and hardware resource configuration and state information exchange. A reference point Se-Ma is used for queries in the NFV deployment template and NFV infrastructure information models. A reference point Vl-Ha interfaces the virtualization layer to hardware resources to create an execution environment for VNFs, and collect state information for managing the VNFs. A reference point Vn-Nf represents the execution environment provided by the NFVI to the VNF (refer to Non-Patent Literature 1 for details).

Some or all of the exemplary embodiments above may be described as follows without being limited thereto.

[Mode 1]

A system including:

a server that comprises a virtualization layer in which a hardware resource is virtualized; and a virtualization control apparatus that requests first information regarding the hardware resource to the server, registers second information corresponding to the first information acquired from the server, and uses the second information to control a network function (Virtual Network Function: VNF) implemented and virtualized by software operating on a virtual machine implemented on the virtualization layer.

[Mode 2]

The system in Mode 1, wherein the virtualization control apparatus comprises:

an NFV integrated management unit that realizes a network service on an NFVI (Network Function Virtualization Infrastructure) providing an execution infrastructure for the VNF;

a virtual infrastructure management unit that manages and controls a resource of the NFVI;

the virtual infrastructure management unit requesting the first information to the server, acquiring the first information from the server, generating the second information, which is required to control the VNF, regarding the server on the basis of the first information, and providing the second information to the NFV integrated management unit; and the NFV integrated management unit registering the second information in a storage unit and controlling the VNF on the basis of the second information.

[Mode 3]

The system in Mode 2, wherein the virtual infrastructure management unit requests the first information to the server according to a predetermined rule, generates a new piece of the second information on the basis of the first information after a change in a hardware configuration of the server when acquiring the first information having the content thereof changed in response to the change, and provides the NFV integrated management unit with the new second information, and the NFV integrated management unit updates the storage unit according to the new second information and controls the VNF on the basis of the new second information.

[Mode 4]

The system in Mode 3, wherein the virtual infrastructure management unit notifies the NFV integrated management unit of absence of such a server from which the first information cannot be acquired when the first information cannot be acquired from such server (i.e., such server being regarded as non-existence), and the NFV integrated management unit deletes the second information corresponding to the absent server from the storage unit when receiving the notification of the absence of the server.

[Mode 5]

The system in any one of Modes 1 to 4, wherein the virtualization layer of the server collects the hardware resource information by referring to a file having information regarding the hardware resource or using a command for acquiring information regarding the hardware resource when receiving the request for the first information.

[Mode 6]

A virtualization control apparatus requesting first information regarding a hardware resource to a server that comprises a virtualization layer in which the hardware resource is virtualized, registering second information corresponding to the first information acquired from the server, and using the second information to control a network function (Virtual Network Function: VNF) implemented and virtualized by software operating on a virtual machine implemented on the virtualization layer.

[Mode 7]

The virtualization control apparatus in Mode 6 further comprising:

an NFV integrated management unit that realizes a network service on an NFVI (Network Function Virtualization Infrastructure) providing an execution infrastructure for the VNF;

a virtual infrastructure management unit that manages and controls a resource of the NFVI;

the virtual infrastructure management unit requesting the first information to the server, acquiring the first information from the server, generating the second information, which is required to control the VNF, regarding the server on the basis of the first information, and providing the second information to the NFV integrated management unit; and the NFV integrated management unit registering the second information in a storage unit and controlling the VNF on the basis of the second information.

[Mode 8]

The virtualization control apparatus in Mode 7, wherein the virtual infrastructure management unit requests the first information from the server according to a predetermined rule, generates a new piece of the second information on the basis of the first information after a change in a hardware configuration of the server when acquiring the first information having a content thereof changed in response to the change, and provides the NFV integrated management unit with the new second information, and the NFV integrated management unit updates the storage unit according to the new second information and controls the VNF on the basis of the new second information.

[Mode 9]

The virtualization control apparatus in Mode 8, wherein the virtual infrastructure management unit notifies the NFV integrated management unit of absence of such a server from which the first information cannot be acquired when the first information cannot be acquired from such server, and the NFV integrated management unit deletes the second information corresponding to the absent server from the storage unit when receiving the notification of the absence of the server.

[Mode 10]

A method for controlling a virtualization control apparatus including:

a step of requesting first information regarding a hardware resource from a server that comprises a virtualization layer in which the hardware resource is virtualized;

a step of registering second information corresponding to the first information acquired to the server; and a step of using the second information to control a network function (Virtual Network Function: VNF) implemented and virtualized by software operating on a virtual machine implemented on the virtualization layer.

[Mode 11]

A program having a computer that controls a virtualization control apparatus execute:

a process of requesting first information regarding a hardware resource from a server that comprises a virtualization layer in which the hardware resource is virtualized;

a process of registering second information corresponding to the first information acquired to the server; and a process of using the second information to control a network function (Virtual Network Function: VNF) implemented and virtualized by software operating on a virtual machine implemented on the virtualization layer.

It should be noted that Modes 10 and 11 can be developed into Modes 2 to 5 as Mode 1.

Further, the disclosure of Non-Patent Literature cited above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications. Particularly, the ranges of the numerical values used in the present description should be interpreted as a numeric value or small range example included in these ranges even in cases where no explanation is provided.

REFERENCE SIGNS LIST

10: EMS
20, 102: virtualization control apparatus
21: NFV integrated management unit
22: VNF management unit
23: virtual infrastructure management unit
24: communication control unit
30: resource pool
31, 31-1 to 31-n, 42, 101: server (physical machine, physical server)
32: hardware resource
33: virtualization layer
34: virtual hardware resource
35: virtual machine
36: guest OS
201: virtual machine deployment unit
202: server spec information management unit
211: VM request specification database (VM request specification DB)
212: server spec information database (server spec information DB)
213: VM operational status database (VM operational status DB)
301: hardware resource information request unit
302: hardware resource information acquisition unit
303: server spec information generation unit
304: server spec information response unit

The invention claimed is:

1. A system, comprising:

a server that comprises a virtualization layer virtualizing a hardware resource; and a virtualization control apparatus comprising a computer and a computer-readable recording medium storing a program, wherein execution of the program by the computer causes the virtualization apparatus to:

request, according to a predetermined rule, first information regarding the hardware resource to the server, wherein the first information includes hardware specification information, convert the first information to second information after a change in hardware configuration of the server, wherein the second information includes the hardware specification information, register the second information, and use the second information to control a Virtual Network Function implemented and virtualized by software operating on a virtual machine implemented on the virtualization layer, wherein the virtualization control apparatus comprises:
an NFV integrated management program configured to realize a network service on an Network Function Virtualization Infrastructure providing an execution infrastructure for the Virtual Network Function; and
a virtual infrastructure management program configured to manage and control a resource of the Network Function Virtualization Infrastructure;
wherein the virtual infrastructure management program is further configured to:
provide the second information to the NFV integrated management program; and
wherein the NFV integrated management program is further configured to register the second information in a storage unit and control the Virtual Network Function on the basis of the second information,
wherein the virtual infrastructure management program is further configured to:
provide the NFV integrated management unit with the second information, and
wherein the NFV integrated management program is further configured to update the storage unit according to the second information and control the Virtual Network Function on the basis of the second information.

2. The system according to claim 1, wherein
the virtual infrastructure management program is further configured to notify the NFV integrated management unit of absence of such a server from which the first information cannot be acquired when the first information cannot be acquired from such server, and
the NFV integrated management program is further configured to delete the second information corresponding to the absent server from the storage unit when receiving the notification of the absence of the server.

3. The system according to claim 1, wherein
the virtualization layer of the server collects the hardware resource information by referring to a file having information regarding the hardware resource or using a command for acquiring information regarding the hardware resource when receiving the request for the first information.

4. A virtualization control apparatus comprising a computer and a computer-readable recording medium storing a program, wherein execution of the program by the computer causes the virtualization apparatus to:
request, according to a predetermined rule, first information regarding a hardware resource to a server that comprises a virtualization layer virtualizing the hardware resource, wherein the first information includes hardware specification information,
convert the first information to second information after a change in hardware configuration of the server, wherein the second information includes the hardware specification information,
register the second information, and
use the second information to control a network function (Virtual Network Function: VNF) implemented and virtualized by software operating on a virtual machine implemented on the virtualization layer;
wherein the virtualization control apparatus further comprises:
an NFV integrated management program configured to realize a network service on an NFVI (Network Function Virtualization Infrastructure) providing an execution infrastructure for the Virtual Network Function; and
a virtual infrastructure management program configured to manage and control a resource of the NFVI;
wherein the virtual infrastructure management program is further configured to:
provide the second information to the NFV integrated management program; and
wherein the NFV integrated management program is further configured to register the second information in a storage unit and control the Virtual Network Function on the basis of the second information,
wherein the virtual infrastructure management program is further configured to:
provide the NFV integrated management unit with the second information, and
wherein the NFV integrated management program is further configured to update the storage unit according to the second information and control the Virtual Network Function on the basis of the second information.

5. The virtualization control apparatus according to claim 4, wherein
the virtual infrastructure management program is further configured to notify the NFV integrated management program of absence of such a server from which the first information cannot be acquired when the first information cannot be acquired from such server, and
the NFV integrated management program is further configured to the second information corresponding to the absent server from the storage unit when receiving the notification of the absence of the server.

6. A method for controlling a virtualization control apparatus, including:
requesting, according to a predetermined rule, first information regarding a hardware resource to a server that comprises a virtualization layer virtualizing the hardware resource, wherein the first information includes hardware specification information;
converting the first information to second information after a change in hardware configuration of the server, wherein the second information includes the hardware specification information;
registering the second information;
using the second information to control a network function Virtual Network Function implemented and virtualized by software operating on a virtual machine implemented on the virtualization layer;
providing, by a virtual infrastructure management program configured to manage and control a resource of the NFVI, the second information to an NFV integrated management program configured to realize a network service on an NFVI (Network Function Virtualization Infrastructure) providing an execution infrastructure for the Virtual Network Function;
registering, by the virtual infrastructure management program, the second information in a storage unit and controlling the Virtual Network Function on the basis of the second information,
providing, by the virtual infrastructure management program, the NFV integrated management unit with the second information, and
updating, by the NFV integrated management program, the storage unit according to the second information and controlling the Virtual Network Function on the basis of the second information.

7. A non-transitory computer-readable recording medium storing a program having a computer that controls a virtualization control apparatus execute:

a process of requesting, according to a predetermined rule, first information regarding a hardware resource to a server that comprises a virtualization layer virtualizing the hardware resource, wherein the first information includes hardware specification information;

a process of converting the first information to second information after a change in hardware configuration of the server, wherein the second information includes the hardware specification information, a process of registering the second information;

a process of using the second information to control a Virtual Network Function implemented and virtualized by software operating on a virtual machine implemented on the virtualization layer;

a process of providing, by a virtual infrastructure management program configured to manage and control a resource of the NFVI, the second information to an NFV integrated management program configured to realize a network service on an NFVI (Network Function Virtualization Infrastructure) providing an execution infrastructure for the Virtual Network Function;

a process of registering, by the virtual infrastructure management program, the second information in a storage unit and controlling the Virtual Network Function on the basis of the second information, a process of providing, by the virtual infrastructure management program, the NFV integrated management unit with the second information, and a process of updating, by the NFV integrated management program, the storage unit according to the second information and controlling the Virtual Network Function on the basis of the second information.

* * * * *